Aug. 8, 1961

R. E. BURTON 2,995,434

PROCESS OF PREPARING A SOIL CONDITIONER
FROM SUBDIVIDED BARK

Filed Dec. 13, 1957

INVENTOR.
Robert Edward Burton

BY Townsend and Townsend
attorneys

United States Patent Office 2,995,434
Patented Aug. 8, 1961

2,995,434
PROCESS OF PREPARING A SOIL CONDITIONER FROM SUBDIVIDED BARK
Robert Edward Burton, Willits, Calif., assignor, by mesne assignments, to Union Lumber Company, a corporation of California
Filed Dec. 13, 1957, Ser. No. 702,709
2 Claims. (Cl. 71—12)

This invention relates to the treatment of sewage effluent and industrial waste by trickling the same through a bed of chopped bark, and more particularly relates to the use of chopped or shredded redwood bark for such purpose.

The present invention has the advantage of solving one of the problems in redwood logging and mill operations, namely, disposal of the bark which is stripped from the logs.

The invention has the further advantage that the resultant product is useful as a soil conditioner and fertilizer. Thus, by practice of this invention the bark provides a low cost lightweight medium for trickling filters and is converted into a valuable end product.

Fibrous and cork barks have from time to time been proposed as soil conditioners. The relatively durable nature of the fiber of such barks and the low cost are principal advantages. One bark which might otherwise be suitable is the bark of redwood trees, but the acidity and nitrogen deficiency of redwood bark are a serious limitation to its use. Acidity of the bark is due to the presence of organic acids which are characterized by a buffer action. Thus, even when neutralized, with the passage of time more hydrogen ion is generated to bring the pH back to an acid condition.

The present invention has for one of its principal objects the treatment of bark to permanently reduce its acidity and likewise to overcome its nitrogen deficiency.

The present invention also solves certain problems involved in the treatment of sewage and industrial waste. In sewage treatment, after the solid wastes have been removed, the effluent from the sedimentation tank or primary clarifier is frequently passed through a trickling filter such as one employing rocks. The effluent has about 1% nitrogenous and other dissolved salts and sugars, more than 70 million coliform bacteria per 100 cc., and a pH of about 7.9 to 8.1. Although it is almost clear and odorless when it leaves the digester, nevertheless it contains bacteria which live on the dissolved organic nutrients and require oxygen for their metabolism. Such oxygen is obtained from the oxygen dissolved in the water. The demand for oxygen creates what is conventionally termed "Biochemical Oxygen Demand" (BOD). Unless this demand is satisfied, anaerobic bacteria cause chemical reactions which produce sulfide salts as well as carbon bisulfide and hydrogen disulfide, thereby resulting in a black color and noxious odor. The absence of dissolved oxygen is extremely detrimental to fish and wildlife and thus is one of the main problems in stream pollution. In conventional sewage treatment, trickling filters are sometimes employed wherein bacteria as well as fungi and algae grow in the presence of air until all or most of the dissolved nutrients are used and the bacteria die or are destroyed by subsequent chlorination.

Trickling filters put oxygen back into the water in the final step of sewage disposal so that the water may be returned to the streams. Thus, sewage disposal plants kill harmful disease-carrying bacteria and oxidize the water after the sewage has absorbed the oxygen from it. Oxidation may be accomplished by oxidation ponds which work well in hot climates but are inefficient in cold weather.

Trickling filters used in accordance with the above described process have a number of limitations. One limitation is the fact that the growth of fungi and algae eventually destroys the efficiency of the filter. Another disadvantage is the fact that slime sloughs off the rocks and must be further processed through a secondary clarifier. Proper rocks, from the standpoint of chemical inertness and of smooth surface, are difficult to obtain and expensive.

Sewage disposal plants are usually located in the lowest spot in the area, frequently on swampy ground. The weight of a large quantity of rock in conventional filters causes the filter to tip or sink, whereas the use of bark in accordance with this invention provides a lightweight medium. Further, the bark absorbs part of the water, whereas rocks do not.

The present invention, employing chopped bark as the filtering material, causes the slime, algae and fungi to adhere closely to the bark by reason of its fibrous nature. Hence, the slime does not slough off. Further, when the capacity of the bark is substantially exhausted, the bark may be removed and replaced. The slime remains with the bark and is used in the fertilizer.

One of the important features of the invention is the fact that the spores existing in the slime are maintained for prolonged periods of time in a relatively moist condition by reason of the moisture in the bark. Hence, even though the bark is relatively dry, nevertheless drying of the spores is avoided and they remain active.

In modern agriculture, it is common practice to use various chemical sprays and soil fumigants to control plant diseases of various kinds. Such treatment reduces the micro-biological community in the soil very sharply, although complete sterilization is virtually impossible to achieve. However, any micro-organisms which enter the soil as by airborne spores or on the roots or seeds of planted stock multiply very rapidly, since they do not have to compete with other micro-organisms for food, water and air. Thus, plant disease spreads very rapidly in many cases. One of the features of the present invention is the fact that the soil conditioner contains an active micro-biological community which is harmless to plants and yet, at the same time, prevents the increase of destructive micro-organisms by the process of competition. At the same time, the micro-organisms in the soil conditioner are not of the type which are unsafe for humans to handle or which make the crops grown unfit for human consumption. The bacteria originally in the sewage, which is of a harmful nature and originates in digestive tracts, cannot survive except in the range of 92–100° F., and therefore soon die and fail in competing with other forms of bacteria for food, air and water.

Various types of industrial wastes, some of which are hereinafter set forth, present problems similar to those encountered in sewage treatment. In accordance with the present invention, such wastes may be treated in a relatively simple and inexpensive manner and then trickled through the bark. The treatment overcomes the problem of pollution and noxious odors encountered in industrial waste treatment and, at the same time, produces a useful fertilizer and soil conditioner product.

In accordance with the present invention, bark is used as a filter medium for sewage effluent or industrial wastes and solves the problem of disposal of such wastes. At the same time, the alkaline characteristics of the wastes neutralize the acid condition of the bark. Such neutralization is not temporary but, on the contrary, is permanent in that the slimes adhere closely to the bark and the material permeates the interstices of the bark fibers, with the result that the bark remains substantiatlly permanently neutralized. Furthermore, the nitrogen deficiency of the bark is overcome and a positive nitrogen content results. The microorganisms that are required to cause decay of portions of the bark fiber and parenchymous tissue in turn require nitrogen for their metabolic processes and growth. Rather than acquiring this nitrogen from the soil or from nitrogen added as a soil conditioner, in accordance with this invention the deficiency is overcome by the slimes and other material added by the sewage or industrial waste treatment. The decaying process extends over a period of months and years without creating a nitrogen deficiency in the soil being treated.

The present invention provides a rechargeable material for use in trickling filters, which is inexpensive and relatively easily handled. As a matter of fact, the material is largely a waste product in sawmill and paper mill operations, and the disposal of bark is one of the problems encountered in mill operation. At the same time the present invention solves the problem of pollution and noxious odors resulting from sewage treatment and industrial wastes.

A still further feature of the invention is the provision of a fertilizer and soil conditioner which has a permanently increased pH and in which, by accretion and absorption, the nitrogen deficiency is overcome.

In modern agriculture and gardening, fertilizer is supplied to the soil in the form of natural and manufactured nitrogen. Natural manures are satisfactory sources of nitrogen, but the organic material in the manures is various types of cellulose fibers originally found in grasses or cereals and is non-durable in contact with the soil. The result of treatment with such fertilizers is that the soil-conditioning benefits are gone in one season. The nitrogen is immediately available to the plant, but such is likewise the case with fertilizer produced in accordance with this invention. Another drawback of natural manures is the presence of weed seeds.

In accordance with the present invention, there is provided a durable fiber that was found in the bark coated with the slime deposit, rich in nitrogen and other plant nutrients and completely free of weed seeds. Such fiber will last from five to ten years in contact with the soil, and during that time will furnish the benefits of organic material.

Other objects of the present invention will become apparent upon reading the following specification and referring to the accompanying drawings in which similar characters of reference represent corresponding parts in each of the several views.

Figure 1:
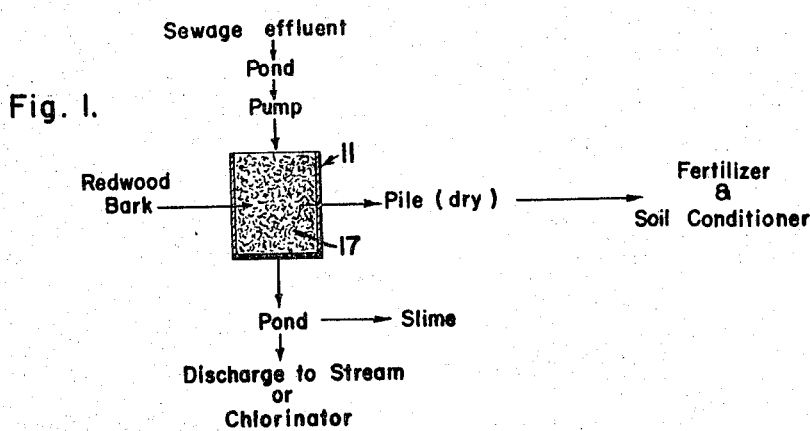
FIG. 1 is a schematic flow sheet.
Figure 2:
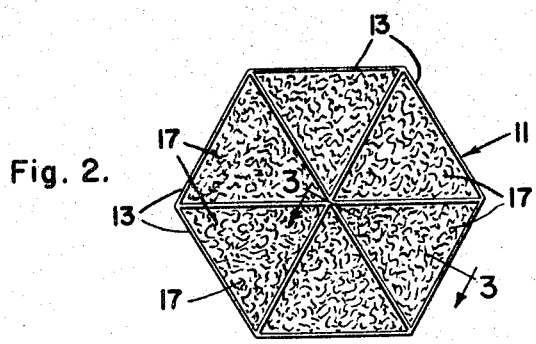
FIG. 2 is a cross-section through a trickling filter.
Figure 3:
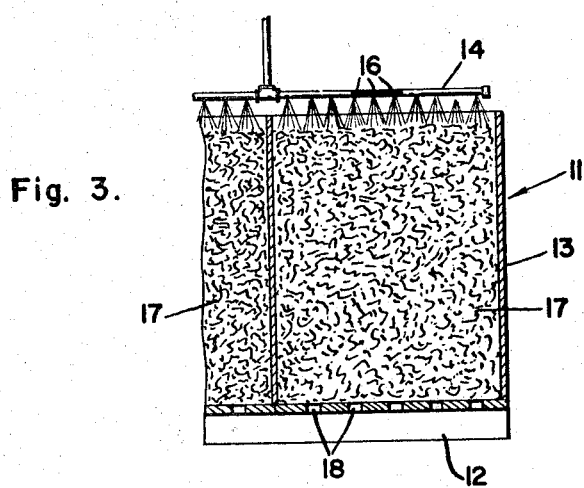
FIG. 3 is an enlarged sectional view taken substantially along 3—3 of FIG. 2.

Virtually all methods of sewage disposal operate on the same basic principles. Solid wastes are removed by various types of primary clarifiers. Thereupon, the bacteria and biochemical oxygen demand are reduced by leach fields, trickling filters, oxidation ponds and the like. The fact that sewage offers a source of fertilizer material has long been recognized, but most attempts at finding commercial fertilizers have centered around sewage sludge. Investigation shows, however, that most of the nitrogen present in the sewage is dissolved in the water, which is drawn from the digester. Such effluent has about 1% nitrogenous and other dissolved salts and sugars, more than 70 million coliform bacteria per 100 cc., and a pH of about 7.9 to 8.1. Most conventional trickling filter systems for BOD removal involve trickling the material to be treated over smooth rocks, sand, slag, coal or other materials. This provides a surface for the algae, fungi or bacteria slime to grow on and keeps the slime supplied with food and water. As the process continues, the layer of slime becomes thicker, and the inner layers die, with the result that the slime sloughs off the rocks or other filter material. Hence, some sort of secondary clarifier is generally required to remove the slime from the water. If, however, the slime does not slough off, then the trickling filter becomes clogged, with the result that air and water can no longer reach the slime, and thereupon, the slime dies and begins to decay, which in turn increases the bacteria count and causes odors and discoloration.

Industrial wastes of various types have similar problems. Examples of such industrial wastes are cannery waste water, water used to flush the killing floor of meat packing plants, wherein blood and proteins are mixed with the water, and also water used to wash the by-products of packing houses. Pulp and paper mill waste water also contains dissolved wood sugars, lignin, hemicellulose and dissolved lignins, tannins and carbolic acid. Other industrial wastes which are suitable for treatment by the instant process will readily occur to one skilled in this art.

The first step in treating industrial wastes is to screen out whatever solids are present. Thereupon, the liquid is pretreated to bring it into an appropirate range of a balanced nutrient solution for the microorganisms that bring about the BOD reduction wherever the waste water does not naturally have such characteristics. Treatment may be accomplished by adding nutrients in the form of nitrogen and phosphates required by the slime bacteria and fungi. Examples of such nutrients are ammonium phosphate, liquid ammonia, etc. The pH should be adjusted to the general range of 6.5 to 9.5 and the BOD is effective in the range of 100 to 700 parts per million. The dissolved nutrient values should be around 1% nitrogenous and other dissolved salts and sugars.

The sewage effluent or industrial waste water, as above described, is screened to remove solids, settled and ponded, and then pumped and trickled through a filter bed which may be several feet thick, the bed being made up preferably of chopped fibrous or cork barks.

In a preferred embodiment of the invention, chopped redwood bark is employed. Redwood bark has a pH of about 3.5, the acidity being buffered, and also has a nitrogen deficiency. Further, redwood bark offers certain advantages in soil conditioning, by reason of its relatively durable nature, which prevents too rapid decay.

As the liquid is trickled through the bark filter, slime grows on the bark, which is made up of fungi and algae and contains substantial quantities of bacteria. The rough bark texture helps to adhere the slime and the interstices of the bark fibers are filled with slime. The slime has a very high nitrogen content of 8 to 10%. This treatment continues until the capacity of the bark to handle slime is exhausted. Thereupon, the filter bed is re-charged with additional bark and the treated bark is preferably placed in piles to partially dry and cure for two weeks or more, during which time the slime decays and is more competely absorbed by the fibers of the bark. Partial drying of the bark is desirable to facilitate handling of the material as a fertilizer, but the drying is not so extensive as to kill the spores.

The bark material will absorb water up to about 60–70% moisture content, and above that content the water tends to exclude air, thereby causing an anerobic decomposition to set in, which causes generation of noxious gases. On the other hand, drying of the material below about 15–20% causes cessation of micro-biological activity. 15–20% moisture is about the fiber saturation point, and drying below that point stops decay and decomposition and further causes the bacteria and fungi to be transmuted into spore form. Thus, the material becomes dusty and not easily re-wettable. Accordingly, drying of the material in piles should be continued until the moisture level is preferably between 20% and 60%.

Bark treated as above described is found to have a pH of about 5.0 to 5.8 and a nitrogen content of about .49% to .67%, whereas prior to the treatment the pH of the bark was considerably lower and a nitrogen deficiency rather than a positive nitrogen content existed.

The sewage water or industrial waste water which is discharged from the filter has little or no BOD, and hence no problem of stream pollution occurs when the water is discharged into nearby streams. The principal nutrient value of the water has been removed and is utilized in the fertilizer.

In use, the bark may be used to treat and condition used for building insulation was employed. In Box No. 3, the same fiber as in Box No. 2 was employed, except that it was separated into layers ten inches thick with six inches air space to facilitate air circulation. Box No. 4 employed redwood shred as it is obtained from a debarker, and in texture resembling coarse hay. Box No. 5 employed redwood bark peeled by a debarker and including only thinner strips of bark. Results are shown in the following table:

| Sample taken from— | Type of Bark | Coliform Bacteria | | BOD | |
|---|---|---|---|---|---|
| | | Per 100 cc. | Percent Reduction | BOD | Percent Reduction |
| Test Series "A": | | | | | |
| Influent | | More than 70,000,000. | | 60 | |
| Effluent from— | | | | | |
| Box 1 | Fir | 230,000 | 99.7 | 4 | 93.3 |
| Box 2 | Redwd. Fiber | 2,300,000 | 96.7 | 48 | 20.0 |
| Box 3 | Redwd. Fiber, 16" Layers | 620,000 | 99.4 | 20 | 66.6 |
| Box 4 | Redwd. Shred | 230,000 | 99.7 | 40 | 33.3 |
| Box 5 | Redwd. Strips | 230,000 | 99.7 | 8 | 86.7 |
| Test Series "B": | | | | | |
| Influent | | | | 349 | |
| Effluent from— | | | | | |
| Weir | | | | 69 | 80 |
| Box 1 | Redwd. Chip | | | 99 | 72 |
| Box 2 | Fir Hogged | | | 99 | 72 |
| Box 5 | Redwd. Chip | | | 89 | 74.5 |
| Box 6 | ___do___ | | | 179 | 48 |
| Test Series "C": | | | | | |
| Influent | | | | 310 | |
| Effluent from— | | | | | |
| Weir | | | | 145 | 53 |
| Box 1 | Redwd. Chip | | | 100 | 67 |
| Box 2 | Fir Hogged | | | 130 | 58 |
| Box 4 | Redwd. Chip | | | 140 | 55 |
| Box 6 | ___do___ | | | 160 | 48 |
| Test Series "D": | | | | | |
| Influent | | | | 170 | |
| Effluent from— | | | | | |
| Weir | | | | 75 | 56 |
| Box 2 | Fir Hogged | | | 100 | 41 |
| Box 3 | Redwd. Chip | | | 80 | 53 |
| Box 5 | ___do___ | | | 70 | 49 |
| Box 6 | ___do___ | | | 70 | 49 | soil. The nondurable portions of the bark fiber and parenchymous tissue continue to decay and the nitrogen needed to sustain this decay is obtained from the dried slime on the bark rather than from the nitrogen in the soil. The supply of nitrogen exists over a long period of time so that all of the decayable portions of the bark rot in the presence of nitrogen and the moisture content of between 30% and 60%.

A trickling filter 11 constructed in accordance with this invention may have a foundation 12 of redwood upon which is placed six redwood pentahedron-shaped boxes 13 which, when placed in position, form an octahedron-shaped unit roughly ten feet in diameter. Above the box a distributing arm 14 is provided, comprising a pipe with spray holes 16 powered by water pressure. The effluent is pumped from a pond into the distributing arm 14 and trickles down over the bark 17 where the dissolved nutrients are used up by the slime and the bacteria die of either exposure or starvation. The bottoms of the boxes 13 have one-inch cracks 18 to allow the water to trickle out as well as allowing air to circulate up through the bark 17. Below the box a small pond is provided to retain the water for about a half hour. This allows the little slime that has sloughed off the bark to settle to the bottom in much the same manner as conventional secondary sewage clarifiers. The supernatant is drawn off with an overflow weir (not shown) and the water is then ready for discharge into a stream or chlorinator.

In tests run on the present invention, effluent having coliform bacteria of more than 70 million per 100 cc. and a BOD of 60 was tested by trickling through beds as follows:

In Box No. 1, Douglas fir bark as it came from a debarker was employed. In Box No. 2, redwood bark fiber fully processed into a fine fiber of the type commonly used for building insulation was employed. In Box No. 3, the same fiber as in Box No. 2 was employed, except that it was separated into layers ten inches thick with six inches air space to facilitate air circulation. Box No. 4 employed redwood shred as it is obtained from a debarker, and in texture resembling coarse hay. Box No. 5 employed redwood bark peeled by a debarker and including only thinner strips of bark.

After treatment, the boxes were emptied and allowed to compost.

In Box No. 1 (fir), Series "A," the entire surface of all the particles was covered with slime but, when the bark particles were broken open, the moisture or slime had not penetrated. Thus, for satisfactory processing, fir particles must be broken down to as fine particles as possible in order to allow the highest percentage of slime. Particles the size of peas or a little larger are ideal.

With respect to Box No. 3, Series "A," the fiber remained mostly dry with only channels of slime showing where the effluent had formed a channel through the fiber.

In Box No. 4, Series "A," there was excellent coverage throughout, but somewhat at less slime formation in the lower quarter of the box.

Box No. 5, Series "A," had fairly good coverage, with the best slime formation in the upper two feet.

Analysis of fertilizers obtained in accordance with the present invention is found in the following table:

| | Treated Redwood Bark—Percent based on oven dry weight | Treated Douglas Fir Bark—Percent based on oven dry weight |
|---|---|---|
| Available Nitrogen | .67 | .49. |
| Phosphorus | .1 | Less than .1. |
| Potash | .066 | .154. |
| pH should remain the same. | | |

As hereinabove noted, at a moisture content of 20–60%, the material is an excellent medium for the growth of bacteria, fungi and protozoa. These forms of life compete with each other. However, the *coli-aerogenes* group of bacteria originating in the digestive tracts cannot survive except in the range of 92°–100° F. and hence die in the soil. Further, the material is safe to handle in use for crops grown for human consumption. The other bacteria, etc., inoculate the soil with a healthy biological group which does not promote plant diseases and by competition overcomes other microorganisms which are harmful to plants.

The chipped redwood bark has been employed in sizes approximating 1/8" thick, 3/4" long, and 1/2" wide. The chip sizes should fall generally within the range of 1/16" to 1/4" in thickness, 1/2" to 2" in length, and 1/2" to 1" in width.

The shred bark should be within the same range, except the length may be from 6" to 2'.

Fir bark may be used in particles approximately 1/4" to 1/2" in diameter.

The term "cork" bark refers to barks of the class or type of fir, pine and the like, while the expression "fiber" or "fibrous" bark refers to barks of the class or type of redwood, cedar and the like.

While the invention has been described in terms of specific detail as to process of product, end product, and methods and manners of usage, for purpose of clarity of description by way of example and illustration, it is understood that modifications in procedural techniques, resultant products obtained, and uses therefor are contemplated within the spirit and concept of the invention and as represented by the spirit and scope of the appended claims.

I claim:

1. In a process of preparing a soil conditioner consisting of subdivided bark covered and impregnated with a microbiological growth, the steps consisting of forming a bed of subdivided bark; trickling through said bed of bark in the presence of air and slime-producing organisms selected from the group consisting of algae, fungi and bacteria, a clarified waste liquid substantially free of undissolved solids and having a high demand for oxygen because of the presence therein of dissolved organic nutrients for microorganisms requiring oxygen for their metabolism, said waste liquid being selected from the group consisting of sewage effluent and industrial wastes containing dissolved organic material and having a pH within the range of 6.5–9.5, said waste liquid also containing dissolved nitrogen compounds necessary for the growth of slime-producing organisms, said waste liquid being passed through said bed until said bark becomes covered and impregnated with a tightly adherent slime of high nitrogen content produced by the growth of the slime-producing organisms utilizing the nutrients dissolved in said waste liquid; and partially drying and curing said slime covered and impregnated bark.

2. The process of claim 1 in which said bark is redwood bark.

References Cited in the file of this patent

UNITED STATES PATENTS

| 281,693 | Hogan | July 24, 1883 |
| 659,503 | Wood | Oct. 9, 1900 |
| 678,924 | Wood | July 23, 1901 |
| 2,092,100 | Waynick | Sept. 7, 1937 |
| 2,398,284 | Briggs | Apr. 9, 1946 |
| 2,861,877 | Geraghty et al. | Nov. 25, 1958 |

FOREIGN PATENTS

| 446,066 | Great Britain | Apr. 23, 1936 |

OTHER REFERENCES

The Sunday Star, Washington, D.C., newspaper, October 25, 1953, page E-7, "Be a . . . Advises" by C. B. Link.